April 26, 1966     F. JAMNIK ET AL     3,248,198
EQUIPMENT FOR EXACT SHAPING ESPECIALLY BY BENDING OF
CONTINUOUSLY PRODUCED GLASS BANDS UNDER SIMULTANEOUS
ALL OVER ROLLING FRICTION
Filed Oct. 24, 1961
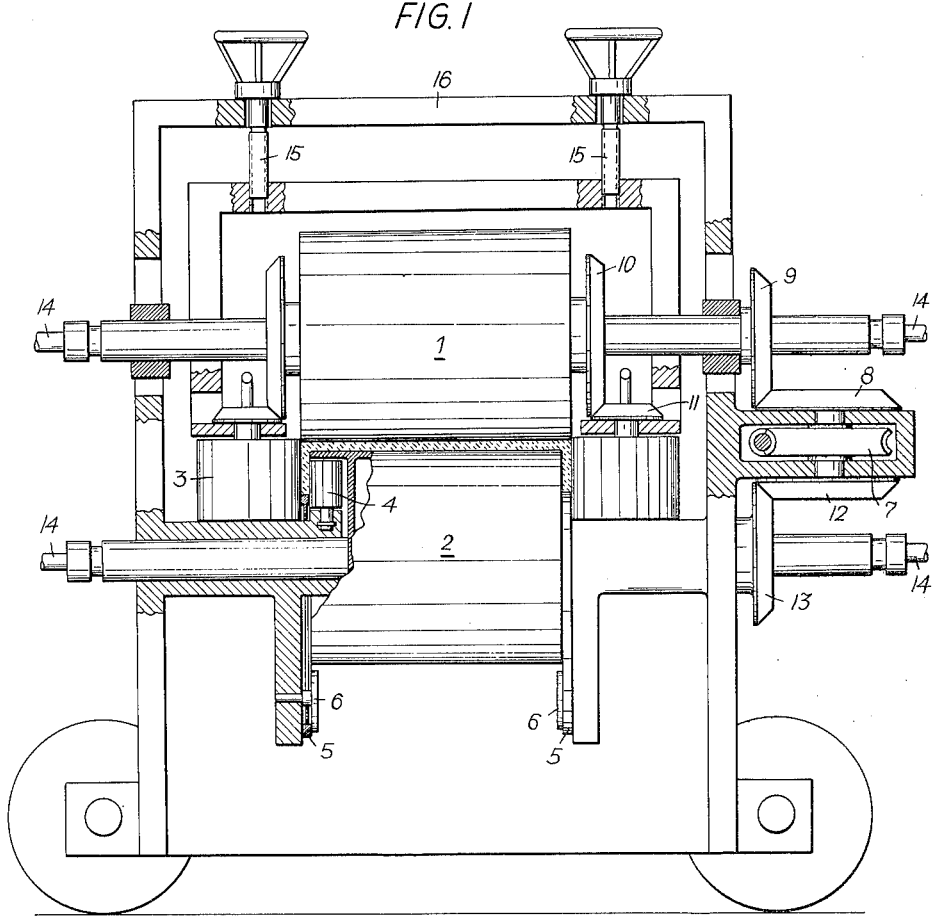
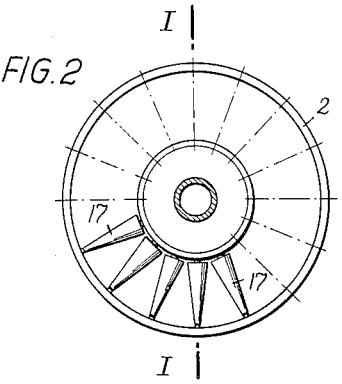
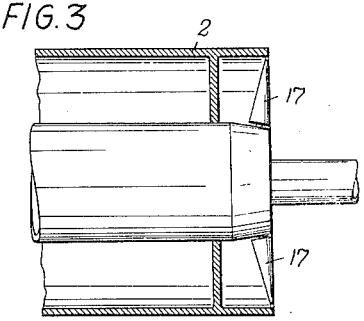

United States Patent Office 3,248,198
Patented Apr. 26, 1966

3,248,198
EQUIPMENT FOR EXACT SHAPING ESPECIALLY BY BENDING OF CONTINUOUSLY PRODUCED GLASS BANDS UNDER SIMULTANEOUS ALL OVER ROLLING FRICTION
Fridolin Jamnik and Adolf Pelzl, Vienna, Austria, assignors to Moosbrunner Glasfabriks-Aktiengesellschaft, Vienna, Austria
Filed Oct. 24, 1961, Ser. No. 147,351
Claims priority, application Austria, Nov. 10, 1960, A 8,389/60
6 Claims. (Cl. 65—245)

The present invention relates to an apparatus for continuously producing profiled glass bands.

It is an object of the present invention to provide for an apparatus for continuously producing a profiled glass band with an exact profile and a perfectly smooth surface.

It is a further object of the present invention to provide for such an apparatus which is constructed in a manner so as not to impart any stresses and longitudinal displacement of portions of the band relative to each other during formation of the profiled band.

With these objects in view, the apparatus of the present invention comprises a plurality of rolls arranged with respect to each other to engage all surface portions of an angled glass band passed between the rollers and these rolls are connected to each other in such a manner that the surface speeds thereof are substantially equal.

The apparatus is illustrated schematically by the drawings:

FIG. 1 shows a vertical cross-section of the apparatus.

FIG. 2 shows another embodiment of a shaping roller seen from the front end.

FIG. 3 shows a longitudinal section along I—I in FIG. 2.

The apparatus of the present invention comprises an upper roller 1, a lower roller 2, lateral rollers 3 arranged opposite the end of roller 2, roller means 4 housed within opposite ends of roller 2 for transmitting rolling friction also to the inner surfaces of flanges of a profiled glass band passing between the aforementioned rollers, and rings 5 actuated by friction guided by roller guide mechanisms 6 are arranged for engaging the edges of the flanges of the profiled glass band.

Gears 7, 8, 9, 10, 11, 12, 13 as shown in FIG. 1 are provided for driving the rollers 1, 2, and 3 with substantially equal surface speed. The rollers 1, 2, and 3 are hollow and tubes 14 respectively extending along the axes of these rollers are provided for the supply and discharge respectively of a fluid media for lowering and increasing the temperature when the equipment is put into operation. The U-type frame 16 which carries the roller 7 for rotation about a fixed axis is equipped with adjusting screws 15 which engage a second substantially U-shaped frame which carries the rollers 1 and 3 so that the gap between rollers 1 and 2 may be adjusted.

Instead of the cylindrical rollers 4 which are provided in the recessed ends of the lower roller 2 in FIG. 1, the recessed ends of the shaping roller 2 may also be equipped with conically shaped rolls 17 (FIGS. 2 and 3). The latter construction offers the advantage that all surface portions of the rolls 17, which rotate not only about their axes but also with the roller 2 about the axis of the latter, will engage the inner surfaces of the profiled glass band with substantially the same speed.

Compared to the so far known shaping means which by the concurrent action of gliding friction caused lesions on the surface of the glass band to be shaped resulting in cracks and breakage of the products, the shaping equipment according to the present invention offers the advantage that the shaping means only rolling engage the glass band and with the same advance speed as the glass band at all their points engaged. The profiled bands obtained thereby have a high degree of accuracy as to size and exactitude of bending and—thanks to their undamaged surface and resulting full conservation of their static properties—are perfectly suited for use as building elements in modern building industry.

What is claimed as new and desired to be secured by Letters Patent is:

1. Apparatus for continuously shaping a glass band of substantially U-shape cross section having a web portion and a pair of outer flange portions inclined to said web portion, said apparatus comprising, in combination, support means; a first pair of rolls each having opposite ends, said rolls mounted on said support means for turning movement about substantially parallel axes and respectively adapted to engage opposite surfaces of the web portion of the band; a second pair of rolls arranged opposite said ends of one roll of said first pair of rolls, respectively, and mounted on said support means turnably about axes inclined to the axes of said first pair of rolls and located in a plane defined by said substantially parallel axes of said first pair of rolls, said second pair of rolls being respectively adapted to engage outer surfaces of the pair of flange portions of the band; means connecting the rolls of said first pair of rolls with those of said second pair of rolls for simultaneous rotation and for maintaining the surface speeds of said rolls substantially equal; and a plurality of additional rolls arranged in two groups and the rolls in the two groups being respectively arranged at said opposite ends and within said one of said first pair of rolls for rotation therewith and each for rotation about its axis, said two groups of additional rolls arranged to successively engage the inner surfaces of said flange portions and each of said plurality of additional rolls having a conical shape so that all surface portions thereof move during rotation of said additional rolls about the axis of said one roll and about their own axes with substantially the same speed as the band surface engaged thereby.

2. Apparatus for continuously shaping a glass band of substantially U-shape cross section having a web portion and a pair of outer flange portions substantially normal to said web portion, said apparatus comprising, in combination, support means; a first pair of rolls each having opposite ends, said rolls mounted on said support means for turning movement about substantially parallel axes and respectively adapted to engage opposite surfaces of the web portion of the band; a second pair of rolls arranged opposite said ends of one roll of said first pair of rolls, respectively, and mounted on said support means turnably about axes substantially normal to the axes of said first pair of rolls and located in a plane defined by said substantially parallel axes of said fixed pair of rolls, said second pair of rolls being respectively adapted to engage outer surfaces of the pair of flange portions of the band; means connecting the rolls of said first pair of rolls with those of said second pair of rolls for simultaneous rotation and for maintaining the surface speeds of said rolls substantially equal; and a plurality of additional rolls arranged in two groups and the rolls in the two groups being respectively arranged at said opposite ends and within said one of said first pair of rolls for rotation therewith and each for rotation about its axis, said two groups of additional rolls arranged to successively engage the inner surfaces of said flange portions and each of said plurality of additional rolls having a conical shape so that all surface portions move during rotation of said additional rolls about the axis of said one roll and about their own axes with substantially the same speed as the band surface engaged thereby.

3. Apparatus for continuously shaping a glass band of substantially U-shape cross section having a web portion and a pair of outer flange portions substantially normal to said web portion, said apparatus comprising, in combination, support means; a first pair of rolls each having opposite ends, said rolls mounted on said support means for turning movement about substantially parallel axes and respectively adapted to engage opposite surfaces of the web portion of the band; a second pair of rolls arranged opposite said ends of one roll of said first pair of rolls, respectively, and mounted on said support means turnably about axes substantially normal to the axes of said first pair of rolls and located in a plane defined by said substantially parallel axes of said first pair of rolls, said second pair of rolls being respectively adapted to engage outer surfaces of the pair of flange portions of the band; means connecting the rolls of said first pair of rolls with those of said second pair of rolls for simultaneous rotation and for maintaining the surface speeds of said rolls substantially equal; a plurality of additional rolls arranged in two groups and the rolls in the two groups being respectively arranged at said opposite ends and within said one of said first pair of rolls for rotation therewith and each for rotation about its axis, said two groups of additional rolls arranged to successively engage the inner surfaces of said flange portions and each of said plurality of additional rolls having a conical shape so that all surface portions thereof move during rotation of said additional rolls about the axis of said one roll and about their own axes with substantially the same speed as the band surface engaged thereby; and means forming part of said support means for mounting one of said pair of first rolls movable toward and away from the other of said pair of first rolls.

4. Apparatus for continuously shaping a glass band of angled cross section comprising, in combination, support means; a first pair of rolls each having opposite ends, said rolls mounted on said support means for turning movement about substantially parallel axes; at least one second pair of rolls having substantially parallel axes located in a plane defined by said substantially parallel axes of said first pair of rolls and extending substantially normal to said axes of said first pair of rolls, said second pair of rolls arranged opposite said ends of one roll of said first pair of rolls respectively, said rolls of said first and second pairs of rolls connected to each other in such a manner that the surface speeds thereof are substantially equal.

5. Apparatus for continuously shaping a glass band of angled cross section comprising, in combination, support means; a pair of rolls mounted on said support means for turning movement about substantially parallel axes, each roll of said pair of rolls having opposite ends; a third roll mounted on said support means turnably about an axis located in a plane defined by said parallel axes of said first pair of rolls and inclined to said axes, said third roll arranged opposite one of said ends of one of said pair of rolls; means connecting said pair of rolls and said third rolls for maintaining the surface speeds of said rolls substantially equal; and a plurality of additional rolls freely rotatably mounted in said one end of said one of said rolls of said pair of rolls for rotation therewith so as to successively contact the glass band adjacent said third roll.

6. Apparatus as set forth in claim 5, wherein each of said additional rolls has a conical shape so that all surface portions thereof move during rotation of said additional rolls with said one roll and about their own axes with substantially the same speed as the band surface engaged thereby.

References Cited by the Examiner

UNITED STATES PATENTS

| 252,460 | 1/1882 | Harris | 72—225 |
|---|---|---|---|
| 2,323,862 | 7/1943 | Zimmerman | 18—19 |

FOREIGN PATENTS

| 1,226,376 | 2/1960 | France. |
|---|---|---|
| 25,770 | 1897 | Great Britain. |

DONALL H. SYLVESTER, *Primary Examiner.*